US011142608B2

(12) United States Patent
Eling et al.

(10) Patent No.: US 11,142,608 B2
(45) Date of Patent: Oct. 12, 2021

(54) METHOD FOR PRODUCING COMPOUNDS HAVING OXAZOLIDINONE GROUPS

(71) Applicant: BASF SE, Ludwigshafen am Rhein (DE)

(72) Inventors: Berend Eling, Lemfoerde (DE); Hans-Josef Thomas, Ludwigshafen (DE); Peter Deglmann, Ludwigshafen (DE); Janina Hengelsberg, Lemfoerde (DE); Tristan Pelzer, Hamburg (DE); Gerrit A. Luinstra, Hamburg (DE)

(73) Assignee: BASF SE

( * ) Notice: Subject to any disclaimer, the term of this patent is extended or adjusted under 35 U.S.C. 154(b) by 116 days.

(21) Appl. No.: 16/494,546

(22) PCT Filed: Mar. 15, 2018

(86) PCT No.: PCT/EP2018/056581
§ 371 (c)(1),
(2) Date: Sep. 16, 2019

(87) PCT Pub. No.: WO2018/167228
PCT Pub. Date: Sep. 20, 2018

(65) Prior Publication Data
US 2020/0010603 A1 Jan. 9, 2020

(30) Foreign Application Priority Data
Mar. 17, 2017 (EP) ..................................... 17161672

(51) Int. Cl.
| C08G 18/18  | (2006.01) |
| C08G 18/58  | (2006.01) |
| C08G 18/73  | (2006.01) |
| C08G 18/75  | (2006.01) |
| C08G 18/76  | (2006.01) |
| C08G 18/16  | (2006.01) |
| C08G 18/20  | (2006.01) |
| C08L 63/04  | (2006.01) |

(52) U.S. Cl.
CPC ....... *C08G 18/1875* (2013.01); *C08G 18/168* (2013.01); *C08G 18/2045* (2013.01); *C08G 18/58* (2013.01); *C08G 18/581* (2013.01); *C08G 18/73* (2013.01); *C08G 18/751* (2013.01); *C08G 18/7635* (2013.01); *C08L 63/04* (2013.01)

(58) Field of Classification Search
CPC .. C08G 18/2045; C08G 18/58; C08G 18/581; C08G 18/168
See application file for complete search history.

(56) References Cited

U.S. PATENT DOCUMENTS

| 5,268,484 A * | 12/1993 | Ishii ..................... C07D 263/24 548/232 |
| 5,314,983 A * | 5/1994 | DeMeuse .................. C08J 3/28 528/73 |
| 5,449,737 A * | 9/1995 | Uchida ................ C08G 18/003 528/73 |
| 5,489,664 A * | 2/1996 | Parodi .................. C07C 255/13 522/166 |

FOREIGN PATENT DOCUMENTS

| GB | 772830 A     | 4/1957  |
| GB | 816923 A     | 7/1959  |
| GB | 1024288 A    | 1/1966  |
| GB | 1017612 A    | 3/1966  |
| WO | 1986006734 A1 | 11/1986 |
| WO | 2015173101 A1 | 11/2015 |
| WO | 2015173110 A1 | 11/2015 |

OTHER PUBLICATIONS

"Current Updates on Oxzaolidinone and Its Significance", International Journal of Medicinal Chemistry, vol. 2012, Oct. 20, 2011. pp. 1-25.*
Buckles, et al., "A Kinetic Study of the Addition of Bromine to Crotonic Acid in Ethylene Chloride", Journal of the American Chemical Society, vol. 75, Issue 20, Oct. 1953, pp. 5048-5052.
Chattaway, et al., "LXXVIII.—Perhalides of Quaternary Ammonium Salts", Journal of the Chemical Society, Transactions, vol. 123, 1923, pp. 6546-6562.
European Search Report for EP Patent Application No. 17161672.5, dated Sep. 7, 2017, 4 pages.
Haller, et al., "Recent Discoveries of Polyhalogen Anions—from Bromine to Fluorine", Journal of Organic and General Chemistry, vol. 640, Issue 7, May 2014, pp. 1281-1291.
International Search Report for PCT Patent Application No. PCT/EP2018/056581, dated May 23, 2018, 4 pages.

* cited by examiner

*Primary Examiner* — Michael L Leonard
(74) *Attorney, Agent, or Firm* — Armstrong Teasdale LLP

(57) ABSTRACT

Described herein are processes for producing moldings comprising oxazolidinone groups, where polyisocyanate (a) is mixed with at least one organic compound (b) having two or more epoxide groups, at least one catalyst (c) for the isocyanate/epoxide reaction, and optionally auxiliary and additive materials (d) to form a reaction mixture, which is introduced into or applied to a mold and reacted to give moldings including oxazolidinone groups, where the catalyst (c) for the isocyanate/epoxide reaction includes a compound of the general formula $[M(R_1)(R_2)(R_3)(R_4)]^+ [X\,I_n]^-$, where M is a nitrogen atom or a phosphorus atom, $R_1$, $R_2$, $R_3$ and $R_4$ are an organic radical, X is fluorine, chlorine, bromine or iodine, I is iodine, and n stands for rational numbers from 0.1 to 10.

12 Claims, No Drawings

METHOD FOR PRODUCING COMPOUNDS HAVING OXAZOLIDINONE GROUPS

CROSS-REFERENCE TO RELATED APPLICATIONS

This application is the national stage entry of PCT/EP2018/056581, filed on Mar. 15, 2018, which claims the benefit of priority to European Patent Application No. 17161672.5, filed Mar. 17, 2017, each of which is incorporated by reference in its entirety herein.

FIELD OF THE INVENTION

The present invention relates to processes for producing moldings comprising oxazolidinone groups, wherein polyisocyanate (a) is mixed with at least one organic compound (b) having two or more epoxide groups, at least one catalyst (c) for the isocyanate/epoxide reaction, and optionally auxiliary and additive materials (d) to form a reaction mixture, which is introduced into or applied to a mold and reacted to give moldings comprising oxazolidinone groups, where the catalyst (c) for the isocyanate/epoxide reaction comprises a compound of the general formula $[M(R_1)(R_2)(R_3)(R_4)]^+$ $[XI_n]^-$, where M is a nitrogen atom or a phosphorus atom, $R_1$, $R_2$, $R_3$ and $R_4$ are an organic radical, X is fluorine, chlorine, bromine or iodine, I is iodine, and n stands for rational numbers from 0.1 to 10. The present invention further relates to a molding comprising oxazolidinone groups and obtainable by such a process, and to the use of the catalysts of the invention for producing moldings comprising oxazolidinone groups.

BACKGROUND

Reaction of epoxides with isocyanurates affords structures which receive both isocyanurate groups and oxazolidinone groups. These compounds are also referred to as epoxy-isocyanate compounds (EPIC compounds). Catalysts used in this context may be lithium bromide, quaternary ammonium salts or Lewis acids, such as aluminum chloride. The resulting EPIC compounds are notable for high long-term temperature stability and low combustibility. However, the materials obtained by such processes are not remeltable, owing to a high fraction of isocyanurate structures and the resultant severe crosslinking, and exhibit high brittleness.

WO 2015173101 describes the use of a catalyst based on quaternary phosphorus, arsenic, antimony or bismuth that leads to a linear oligomeric compound containing oxazolidinone groups and having high regioselectivity, with the resultant regioselective EPIC compounds being notable for low viscosities and relatively low glass transition temperatures.

WO 2015173110 describes the use of a halogen-free catalyst for producing compounds comprising oxazolidinone groups. This document as well describes primarily prepolymers; moldings are not described.

To reduce the fraction of isocyanurate groups and to improve the brittleness of these materials, WO 86/06734 proposes the use of an organoantimony iodide structure. For this purpose, prepolymers containing oxazolidinone groups are prepared and in a second step are cured by addition of further substances, an example being methylenedianiline.

DETAILED DESCRIPTION

It was an object of the present invention to provide a solid containing oxazolidinone groups, more particularly a molding containing oxazolidinone groups, said molding exhibiting outstanding mechanical properties and high temperature stability. Surprisingly, the object of the invention has been achieved by a molding which comprises oxazolidinone groups and is producible by a process wherein polyisocyanate (a) is mixed with at least one organic compound (b) having two or more epoxide groups, at least one catalyst (c) for the isocyanate/epoxide reaction, and optionally auxiliary and additive materials (d) to form a reaction mixture, which is introduced into or applied to a mold and reacted to give moldings comprising oxazolidinone groups, where the catalyst c) for the isocyanate/epoxide reaction comprises a compound of the general formula $[M(R_1)(R_2)(R_3)(R_4)]^+$ $[XI_n]^-$, where M is a nitrogen atom or a phosphorus atom, $R_1$, $R_2$, $R_3$ and $R_4$ are an organic radical, X is fluorine, chlorine, bromine or iodine, I is iodine, and n stands for rational numbers from 0.1 to 10.

In one preferred embodiment, the molding of the invention is obtained in one step. "In one step" here means that all of the components for producing the molding are mixed before the start of the reaction and the reaction takes place subsequently until a molding is obtained, without the addition of further compounds and more particularly without addition of further compounds which comprise groups that are reactive toward isocyanate groups or epoxy groups.

The molding obtained is preferably a solid. In the context of the present invention, a solid has a shore hardness to DIN EN ISO 868 of greater than 10 shore A, preferably greater than 30 shore A and more particularly greater than 50 shore A. In another preferred embodiment, the molding of the invention has a high Charpy notched impact strength to DIN EN ISO 179-1 of preferably greater than 10 kJ/m$^2$, more preferably greater than 20 kJ/m$^2$ and more particularly greater than 30 kJ/m$^2$.

Molds for producing the molding of the invention that may be used are all articles which bring the reaction mixture into a macroscopic shape at least during part of the reaction to form the solid, the macroscopic shape of the solid being evident after curing has taken place to form the solid of the invention as well. Mold materials may be removed after curing, but may also represent part of the molding of the invention, as in the case, for example, of the coating of articles by dip coating, like the dip coating of electronic articles such as transformers. Microscopic shaping, by means, for example, of inclusion of compounds which individually have no influence on the macroscopic shape, such as fillers, are not to be considered as a mold in the sense of the invention. Examples of molds of the invention are open or closed molds, made of metal or plastic, for example, but also winding cores, in the production of wound items or pipes, vacuum molds, of the kind customarily used in vacuum infusion, or molds which permit continuous shaping, as customarily used in pultrusion.

The aliphatic, cycloaliphatic, araliphatic polyfunctional isocyanates known per se and preferably the aromatic polyfunctional isocyanates come into consideration for use as polyisocyanates a). Polyfunctional isocyanates of this type are known per se or are obtainable by methods known per se. Polyfunctional isocyanates may more particularly also be used as mixtures, in which case component a) will accordingly comprise various polyfunctional isocyanates. Polyfunctional isocyanates that come into consideration for use as polyisocyanate have two (hereinafter called diisocyanates) or more than two isocyanate groups per molecule.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate, and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures and preferably aromatic polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 2,4'-, 4,4'- and 2,2'-diisocyanates and polyphenylpolymethylene polyisocyanates (crude MDI) and mixtures of crude MDI and tolylene diisocyanates.

Of particular suitability are 2,2'-, 2,4'- and/or 4,4'-diphenylmethane diisocyanate (MDI), 1,5-naphthylene diisocyanate (NDI), 2,4- and/or 2,6-tolylene diisocyanate (TDI), 3,3'-dimethylbiphenyl diisocyanate, 1,2-diphenylethane diisocyanate and/or p-phenylene diisocyanate (PPDI), tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), 1,4-cyclohexane diisocyanate, 1-methyl-2,4- and/or -2,6-cyclohexane diisocyanate and 4,4'-, 2,4'- and/or 2,2'-dicyclohexylmethane diisocyanate.

Modified polyisocyanates are also frequently used, i.e., products which are obtained by chemical reaction of organic polyisocyanates and which have at least two reactive isocyanate groups per molecule. Polyisocyanates comprising urea, biuret, allophanate, carbodiimide, isocyanurate, uretdione, carbamate and/or urethane groups may be mentioned in particular, frequently also together with unconverted polyisocyanates.

The epoxy-containing component b) comprises any desired aliphatic, cycloaliphatic, aromatic and/or heterocyclic compounds including at least two epoxide groups. The preferred epoxides useful as component b) have from 2 to 4, preferably 2, epoxide groups per molecule and an epoxide equivalent weight of 90 to 500 g/eq, preferably 140 to 220 g/eq.

Suitable polyepoxides are for example polyglycidyl ethers of polyhydric phenols, for example of pyrocatechol, resorcinol, hydroquinone, 4,4'-dihydroxydiphenylpropane (bisphenol A), of 4,4'-dihydroxy-3,3'-dimethyldiphenylmethane, of 4,4'-dihydroxydiphenylmethane (bisphenol F), 4,4'-dihydroxydiphenylcyclohexane, of 4,4'-dihydroxy-3,3'-dimethyldiphenylpropane, of 4,4'-dihydroxybiphenyl, from 4,4'-dihydroxydiphenyl sulfone (bisphenol S), of tris(4-hydroxyphenyl)-methane, the chlorination and bromination products of the aforementioned diphenols, of novolacs (i.e., from reaction products of mono- or polyhydric phenols and/or cresols with aldehydes, especially formaldehyde, in the presence of acidic catalysts in the equivalence ratio of less than 1:1), of diphenols obtained by esterifying 2 mol of the sodium salt of an aromatic oxycarboxylic acid with one mole of a dihaloalkane or of a dihalodialkyl ester (cf. British patent 1 017 612) or of polyphenols obtained by condensation of phenols and long-chain haloparaffins containing at least two halogen atoms (cf. GB patent 1 024 288). There may further be mentioned: polyepoxide compounds based on aromatic amines and epichlorohydrin, e.g., N-di(2,3-epoxypropyl)aniline, N,N'-dimethyl-N,N'-diepoxypropyl-4,4'-diaminodiphenylmethane, N,N-diepoxypropyl-4-aminophenyl glycidyl ether (cf. GB patents 772 830 and 816 923).

Further possibilities are: glycidyl esters of polybasic aromatic, aliphatic and cycloaliphatic carboxylic acids, for example diglycidyl phthalate, diglycidyl isophthalate, diglycidyl terephthalate, diglycidyl adipate and glycidyl esters of reaction products of 1 mol of an aromatic or cycloaliphatic dicarboxylic anhydride and ½ mol of a diol or 1/n mol of a polyol having n hydroxyl groups or diglycidyl hexahydrophthalates, which may optionally be substituted with methyl groups.

Glycidyl ethers of polyhydric alcohols, for example of 1,4-butanediol (Araldite® DY-D, Huntsman), 1,4-butenediol, glycerol, trimethylolpropane (Araldite® DY-T/CH, Huntsman), pentaerythritol and polyethylene glycol can likewise be used. Also of interest are triglycidyl isocyanurate, N,N'-diepoxypropyloxyamide, polyglycidyl thioethers of polyhydric thiols, as for example bismercaptomethylbenzene, diglycidyltrimethylene trisulfone, polyglycidyl ethers based on hydantoins.

It is finally also possible to use epoxidation products of polyunsaturated compounds, such as vegetable oils and conversion products thereof. Epoxidation products of di- and polyolefins, such as butadiene, vinylcyclohexane, 1,5-cyclooctadiene, 1,5,9-cyclododecatriene, chain growth addition polymers and interpolymers which still contain epoxidizable double bonds, for example based on polybutadiene, polyisoprene, butadiene-styrene interpolymers, divinylbenzene, dicyclopentadiene, unsaturated polyesters, also epoxidation products of olefins obtainable via Diels-Alder addition and subsequently converted into polyepoxides by epoxidation with per compound or of compounds containing two cyclopentene or cyclohexene rings linked via bridging atoms or bridging atom groups can likewise be used.

Preference according to the present invention for use as component b) is given to the following polyepoxide compounds or mixtures thereof:

polyglycidyl ethers of polyhydric phenols, in particular of bisphenol A (Araldit® GY250, Huntsman; Ruetapox® 0162, Bakelite AG; Epikote® Resin 162, Hexion Specialty Chemicals GmbH; Eurepox 710, Brenntag GmbH; Araldit® GY250, Huntsman, D.E.R.™ 332, The Dow Chemical Company; Epilox® A 18-00, LEUNA-Harze GmbH) or bisphenol F (4,4'-dihydroxydiphenylmethane, Araldit® GY281, Huntsman; Epilox® F 16-01, LEUNA-Harze GmbH; Epilox® F 17-00, LEUNA-Harze GmbH), polyepoxy compounds based on aromatic amines, especially bis (N-epoxypropyl)aniline, N,N'-dimethyl-N,N'-diepoxypropyl-4,4'-diaminodiphenylmethane and N,N-diepoxypropyl-4-aminophenyl glycidyl ether; polyglycidyl esters of cycloaliphatic dicarboxylic acids, especially diglycidyl hexahydrophthalate and polyepoxides from the reaction product of n mol of hexahydrophthalic anhydride and 1 mol of a polyol having n hydroxyl groups (n=integer from 2-6), especially 3 mol of hexahydrophthalic anhydride and one mole of 1,1,1-trimethylolpropane; 3,4-epoxycyclohexylmethyl 3,4-epoxycyclohexanecarboxylate.

Polyglycidyl ethers of bisphenol A and bisphenol F and also of novolacs are very particularly preferable, in particular polyglycidyl ethers of bisphenol F.

Liquid polyepoxides or low-viscosity diepoxides, such as bis(N-epoxypropyl)aniline or vinylcyclohexane diepoxide can in special cases further reduce the viscosity of already liquid polyepoxides or transform solid polyepoxides into liquid mixtures.

Component b) is used preferably in an amount corresponding to an equivalents ratio of isocyanate groups to epoxide groups of 1:10 to 10:1, preferably 1:5 to 5:1 and more particularly 1:1.5 to 2:1.

Catalysts c) accelerate the reaction of the organic compound (b) comprising epoxide groups with the polyisocyanates (a) strongly. The catalyst (c) here comprises at least one compound of the general formula

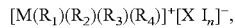

$[M(R_1)(R_2)(R_3)(R_4)]^+[X\,I_n]^-$, where M is a nitrogen atom or a phosphorus atom, preferably a nitrogen atom, $R_1$, $R_2$, $R_3$ and $R_4$ are an organic radical, in each case selected independently of one another from the group consisting of linear or branched-chain alkyl radicals having 1 to 22 carbon atoms and being possibly substituted by heteroatoms or substituents comprising heteroatoms, and of alkyl-bridged cycloaliphatic or aromatic groups having 3 to 22 carbon atoms and being possibly substituted by heteroatoms or by groups comprising heteroatoms, and where M may be part of the ring, and of aryl radicals having 6 to 18 carbon atoms and being possibly substituted by alkyl groups having 1 to 10 carbon atoms and/or heteroatoms, where M may be part of the ring, X is fluoride, chloride, bromide or iodide, preferably chloride or bromide, I is iodine, and n stands for rational numbers from 0.1 to 10, preferably 0.5 to 3, more preferably 1.5 to 2.5 and more particularly 2.0.

The radicals $R_1$, $R_2$, $R_3$ and $R_4$ are preferably an organic radical, in each case independently of one another selected from the group consisting of phenyl, cyclohexyl and linear or branched-chain alkyl groups having 1 to 6 carbon atoms, which in each case may also be substituted, but preferably are unsubstituted. In one particularly preferred embodiment the radicals $R_1$, $R_2$, $R_3$ and $R_4$ are identical.

In a further embodiment of the present invention, the compounds $[M(R_1)(R_2)(R_3)(R_4)]^+$ used as cations are compounds which comprise at least one five- to six-membered heterocycle which is formed by the bridge of two radicals R, more particularly a five-membered heterocycle which has at least one nitrogen atom and also, optionally, an oxygen atom or sulfur atom. Particularly preferred compounds are those which comprise at least one five- to six-membered heterocycle which has one, two or three nitrogen atoms and one sulfur atom or one oxygen atom, especially preferably those having two nitrogen atoms. Further preferred are aromatic heterocycles, such as pyridinium, pyridazinium, pyrimidinium, pyrazinium, imidazolium, pyrazolium, pyrazolinium, imidazolium, thiazolium, oxazolium, pyrrolidinium and imidazolidinium. In the case of the aromatic heterocycles, the radical —$R_4$ may be replaced by an aromatic double bond.

For the purposes of the present invention, heteroatoms are atoms which are not carbon or hydrogen, with heteroatoms preferably comprising nitrogen, oxygen, sulfur, phosphorus or halogen atoms, such as fluorine, chlorine or bromine. [X $I_n$]$^-$ is anion, where X is fluoride, chloride, bromide or iodide and I is elemental iodine. The exact position of the negative charge here is not a subject of the invention. Customarily the charge will lie at X, meaning that X is $X^-$, i.e., fluoride (F—), chloride (Cl—), bromide (Br—) or iodide (I—). This anion [X $I_n$]$^-$ is obtained by reaction of $[M(R_1)(R_2)(R_3)(R_4)]^+\,X^-$ with elemental iodine in a molar ratio of 1:n, where n is as defined above. Compounds $[M(R_1)(R_2)(R_3)(R_4)]^+\,X^-$ are known and include, for example, tetrabutylammonium chloride, tetrabutylammonium bromide or tetrabutylphosphonium bromide, and are available commercially. The preparation of the quaternary ammonium trihalides is known as well and is described, for example, in H. Haller et al. Z. Anorgan. Allg. Chem., 2014, 640, (7), 1281-1291.

The catalysts (c) are used customarily in an amount of 0.1 to 10 wt %, preferably 0.2 to 5 wt % and more particularly 0.5 to 3 wt %, based in each case on the total weight of components (a), (b) and (c).

Additive materials d) used may be, for example, polyols, polyamines, blowing agents, fillers, known foam stabilizers, mold release agents, and also known UV stabilizers and hydrolysis inhibitors.

Polyols comprise compounds which have at least 2, more particularly 2 to 8 and preferably 2 to 3 alcoholic hydroxyl groups and a molecular weight of 62 to 8000 g/mol. Such compounds are known per se as a synthesis component for polyurethane and comprise low molecular mass chain extenders and polyols with number-average molecular weights of greater than 200 g/mol. Examples of chain extenders are simple polyhydric alcohols such as ethylene glycol, hexane-1,6-diol, glycerol or trimethylolpropane; examples of polyols are polyols containing dimethylsiloxane units, e.g., bis(dimethylhydroxymethylsilyl) ether; polyhydroxyl compounds containing ester groups, such as castor oil, for example, or polyhydroxy polyesters, of the kind obtainable by polycondensation of excess amounts of simple polyhydric alcohols of the type just exemplified with preferably dibasic carboxylic acids and/or their hydrides such as, for example, adipic acid, phthalic acid or phthalic anhydride; polyhydroxyl polyethers of the kind obtainable by addition of alkylene oxides such as propylene oxide and/or ethylene oxide onto suitable starter molecules such as water, for example, the simple alcohols just stated, or else amines having at least two aminic NH bonds; or polycarbonate polyols, which may be obtained, for example, from polyhydric alcohols and carbonates or phosgene.

Polyamines which can be used are compounds having at least two isocyanates-reactive hydrogen atoms, of which at least one belongs to a primary or secondary amino group. They comprise polyetheramines and compounds with molecular weights of less than 500 g/mol. Polyetheramines are known from polyurethane chemistry and may be obtained by terminal amination of polyether polyols. They preferably have molecular weights of 500 to 8000 g/mol. The compounds preferably used with two amino groups and with molecular weights of less than 500 g/mol more preferably have a molecular weight of 58 to 300 g/mol and more particularly of 100 to 200 g/mol. The isocyanate-reactive groups of these compounds are preferably two primary amino groups. In one particularly preferred embodiment, the primary amino groups are bonded to aromatic carbon atoms, preferably to an aromatic 6-membered ring, more particularly in meta- or para-position.

Employed with preference are less than 20 wt %, more preferably less than 10 wt %, of polyols and/or polyamines, and more particularly no polyols and/or polyamines. Where polyols and/or polyamines are used, this is done preferably in amounts such that the ratio of isocyanate groups in the polyisocyanates (a) to isocyanate-reactive compounds of component (d) is greater than 1.5:1, preferably greater than 5:1 and more particularly greater than 10:1.

Blowing agents, which are used to produce the foams of the invention, include chemical blowing agents, such as water, formic acid and mixtures thereof. Further to formic acid and water, a chemical blowing agent suitable is phospholine oxide. These agents react with isocyanate groups to form carbon dioxide and, in the case of formic acid, to form carbon dioxide and carbon monoxide. Because these blowing agents release the gas through a chemical reaction with the isocyanate groups, they are referred to as chemical blowing agents. It is also possible for physical blowing agents to be used, such as low-boiling hydrocarbons. Particularly suitable are liquids which are inert toward the polyisocyanates a) and have boiling points below 100° C., preferably below 50° C., under atmospheric pressure, so that they evaporate under the influence of the exothermic polyaddition reaction. Examples of such liquids used with preference are alkanes, such as heptane, hexane, n- and isopentane, preferably technical mixtures of n- and isopentanes, n- and isobutane and propane, cycloalkanes, such as cyclopentane and/or cyclohexane, ethers, such as furan, dimethyl ether and diethyl ether, ketones, such as acetone and methyl ethyl ketone, alkyl esters of carboxylic acids, such as methyl formate, dimethyl oxalate and ethyl acetate, and halogenated hydrocarbons, such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane, pentafluoropropane, heptafluoropropane and hexafluorobutene. Mixtures of these low-boiling liquids with one another and/or with other substituted or unsubstituted hydrocarbons may also be used. The physical blowing agents are preferably soluble in the component (b).

If blowing agents are used, then it is preferred that no halogenated hydrocarbons are used as blowing agents. Preferred for use as chemical blowing agents are water, formic acid/water mixtures or formic acid, and particularly preferred chemical blowing agents are formic acid-water mixtures or formic acid. Preferred for use as physical blowing agents are pentane isomers, or mixtures of pentane isomers. In one particularly preferred embodiment, less than 5 wt %, preferably less than 2 wt %, more preferably less than 0.5 wt % and more particularly less than 0.1 wt % of blowing agent is used, based in each case on the total weight of components (a) to (d).

Further auxiliary and additive agents (d) for optional accompanying use are, for example, fillers such as, for example, finely ground quartz, chalk, Microdol, aluminum oxide, silicon carbide, graphite or corundum; pigments such as, for example, titanium dioxide, iron oxide or organic pigments such as phthalocyanine pigments; plasticizers such as, for example, dioctyl phthalate, tributyl phosphate or triphenyl phosphate; incorporable compatibilizers such as methacrylic acid, β-hydroxypropyl ester, maleic esters and fumaric esters; substances enhancing flame retardancy, such as red phosphorus or magnesium oxide; soluble dyes or reinforcing materials such as, for example, glass fibers or glass fabrics. Likewise suitable are C fibers and C-fiber fabrics and other organic polymer fibers such as, for example, aramid fibers or LC polymer fibers (LC="liquid crystal"). Also contemplated as fillers are metallic fillers, such as aluminum, copper, iron and/or steel. The metallic fillers are used more particularly in granular form and/or powder form.

The auxiliary and additive agents (d) may also, furthermore, comprise known foam stabilizers of the polyethersiloxane type, mold release agents, e.g., polyamide waxes and/or stearic acid derivatives and/or natural wax, an example being carnauba wax, and also known UV stabilizers and hydrolysis inhibitors.

The solids of the invention comprising oxazolidinone groups are preferably thermosets. To produce thermosets, these reactants with respect to reactive groups preferably have an average functionality of preferably 1.9 to 3.0, more preferably greater than 1.95 to 2.5. The properties of the compound containing oxazolidinone groups here can be tailored in each case on the basis of the compounds employed, in accordance with polyurethane chemistry—by adjustment to the crosslinking density, for example.

The moldings of the invention are produced by mixing the components (a) to (d) to form a reaction mixture and allowing the reaction mixture to react to completion in or on a mold. It is possible for all of the reactants to be mixed simultaneously. In one embodiment of the present invention, a polyol component comprising components (b) and (c) and also optionally (d) is introduced initially and is mixed with the Isocyanate component to form the reaction mixture. In another embodiment of the invention, the polyisocyanates (a) are mixed with the catalysts (c) to form an isocyanate component, which is mixed with component (b) and optionally (d) to form the reaction mixture. The reaction mixture is reacted to form the molding comprising oxazolidinone groups preferably at a temperature of greater 120° C., more preferably at a temperature of 150° C. to 275° C., and more particularly at a temperature of 180 to 220° C., the temperature being set preferably via the temperature control of the mold or by curing in an oven. The temperature of the starting materials on mixing is preferably 0 to 100° C., more preferably 20 to 80 and more particularly 25 to 60° C. When sufficient strength has been acquired, the moldings can be removed from the mold.

The compounds of the invention containing oxazolidinone groups are notable for very high heat stability and also outstanding mechanical properties, as for example an outstanding notched impact strength. Thermosets of the present invention containing oxazolidinone groups may be used as coatings, adhesives and composite materials, for example. Hence the reaction mixtures of the invention have a long opening time at 50° C. Moreover, the thermosets of the invention containing oxazolidinone groups exhibit high glass transition temperatures, outstanding mechanical values, such as tensile strength or hardness, and high impact strengths, so making them outstandingly suitable for use as dipping varnishes for electronic applications, such as an insulation layer for transformers, in composite components, such as rotation-wound components, masts for example, or large composite components which are produced, for example, by vacuum infusion technology, such as vanes for wind turbines, for example. Thermosets of the invention containing oxazolidinone groups are used with particular preference in composite components, such as rotation-wound components, and, in particular, large composite components which are produced, for example, by vacuum infusion technology, such as vanes for wind turbines, for example.

EXAMPLES

The invention is illustrated below using examples.
Raw Materials:
Epoxy 1: Bisphenol A-based diglycidyl ether (Lupranate Epilox A19-03 from LEUNA-Harze GmbH), with an epoxide equivalent weight (g/equiv.) of 190.
Epoxy 2: o-Cresyl glycidyl ether (Grilonit RV 1805 from EMS-Griltech) with an epoxide equivalent weight (g/equiv.) of 168.
Iso 1: Uretonimine-modified 4,4'MDI (Lupranate MM103 from BASF).
Iso 2: 4,4'-MDI-based prepolymer with an NCO value of 23% (Lupranate MP102 from BASF).
Iso 3: 4,4'-MDI (Lupranate ME from BASF)

Mesamoll: (C10-C21) Alkanesulfonic acid phenyl ester from Lanxess.

Tetrabutylammonium chloride, tetrabutylammonium bromide,

Tetraphenylphosphonium bromide and iodine from Sigma-Aldrich.

Examples

Preparation of the Catalysts:

Catalyst 1:

27.8 g of tetrabutylammonium chloride (0.1 mol) and 25.4 g of $I_2$ (0.1 mol) are weighed out into a 100 mL glass flask. The vessel is closed and heated at 130° C. in an oven for 2 hours. Thereafter the temperature is reduced from 90° C. The flask is taken from the oven and the reaction product is mixed directly with 79.8 g of Mesamoll, heated briefly to 90° C. beforehand. The flask is subsequently closed and the mixture is further cooled, stored at 55° C. and used as it is. The mixing ratio of reaction product and Mesamoll was 0.4:0.6. The catalyst is called catalyst 1 below.

Catalyst 2:

For the preparation of the catalyst 2, the molar ratio of tetrabutylammonium chloride to iodine ($I_2$) is reduced to 1:0.5. This is done by amending the amounts of the reactants to 27.8 g of tetrabutylammonium chloride and 12.7 g of iodine. The synthesis and addition of Mesamoll are carried out as described for catalyst 1; the amount of Mesamoll added is 60.8 g. This corresponds to a mixing ratio of reaction product and Mesamoll of 0.4:0.6.

Catalyst 3:

For the preparation of the catalyst 3, tetrabutylammonium bromide is reacted with iodine ($I_2$) in a molar ratio of 1:1. This is done by reacting 32.2 g of tetrabutylammonium bromide and 25.4 g of iodine with one another. The synthesis and addition of Mesamoll are carried out as described for catalyst 1; the amount of Mesamoll added is 86.4 g. This corresponds to a mixing ratio of reaction product and Mesamoll of 0.4:0.6.

Catalyst 4:

For the preparation of the catalyst 4, the molar ratio of tetrabutylammonium bromide to iodine ($I_2$) is reduced to 1:0.5. This is done by amending the amounts of the reactants to 32.2 g of tetrabutylammonium bromide and 12.7 g of iodine. The synthesis and addition of Mesamoll are carried out as described for catalyst 1; the amount of Mesamoll added is 67.4 g. This corresponds to a mixing ratio of reaction product and Mesamoll of 0.4:0.6.

Catalyst A:

20.0 g of tetrabutylammonium chloride and 30.0 g of Mesamoll are weighed out into a 100 mL glass flask. The vessel is closed and is heated at 130° C. in an oven for 2 hours. This gave a liquid component which was stable even on cooling to room temperature.

Catalyst B:

20.0 g of tetrabutylammonium bromide and 30.0 g of Mesamoll are weighed out into a 100 mL glass flask. The vessel is closed and is heated at 130° C. in an oven for 2 hours. This gave a liquid component which was stable even on cooling to room temperature.

Detection of Formation of Oxazolidinone Groups

Catalysts 1 to 4 and catalysts A and B are used for preparing polymers containing oxazolidinone groups. This is done by preparing the polymers from epoxy 1 and iso 1, with the molar ratio of the reactive groups being calculated at one to one and with the nominal molar amount of catalyst, based on the tetrabutylammonium halide content, being kept constant. For this purpose the specified components were heated at 55° C. and mixed in a Speedmixer at 1600 rpm for half a minute. Then the mixture was introduced into an aluminum mold with dimensions of 15×20×0.2 cm, open at the top and at a temperature of 200° C., and reacted fully over a period of 30 minutes.

The detection method used for the formation of oxazolidinone groups was IR spectroscopy. The IR analysis was carried out using an IR instrument from Bruker, model ALPHA-27, equipped with a diamond measuring head. A small sample of polymer (a few milligrams) was pressed against the diamond measuring head and a spectrum was recorded. The formation of the oxazolidinone and isocyanurate groups was detected by the presence of a band at 1749 and 1704 cm$^{-1}$, respectively. The ratio of oxazolidinone to isocyanurate was evaluated on the basis of the ratio of the height (in cm) of the two bands (height at 1749 cm$^{-1}$ divided by height at 1704 cm$^{-1}$). The higher this value, the more oxazolidinone and the fewer isocyanurate groups the polymer contains. It should be noted that the epoxy 1 and iso 1 raw materials have no absorptions in the relevant IR frequency range. The baseline was drawn through the absorption values at 1850 cm$^{-1}$ and a minimum which is found at an absorption of around 1550 cm$^{-1}$.

Table 1 describes the mixtures and the oxazolidinone: isocyanurate ratios (Ox/Is) measured on the plates. Table 1 also shows that the plates produced with the catalysts of the invention exhibit a much higher oxazolidinone content.

TABLE 1

| Catalyst | | | | | | |
|---|---|---|---|---|---|---|
| 1 [parts by weight] | 4.0 | | | | | |
| 2 [parts by weight] | | 3.0 | | | | |
| 3 [parts by weight] | | | 4.3 | | | |
| 4 [parts by weight] | | | | 3.3 | | |
| A [parts by weight] | | | | | 2.0 | |
| B [parts by weight] | | | | | | 2.4 |
| Tg [° C.] | 131 | 113 | 135 | 119 | 110 | 110 |
| Shore hardness | 86 | 86 | 85 | 85 | 86 | 87 |
| Notched impact strength [kJ/m$^2$] | 71 | 24 | 41 | 42 | 8 | 14 |
| Flexural strength [N/mm$^2$] | 134 | 141 | 147 | 146 | 104 | 119 |
| Flexural elasticity modulus [N/mm$^2$] | 2875 | 3345 | 2900 | 3317 | 3156 | 3230 |
| Ox/Is ratio | 1.38 | 1.07 | 1.85 | 1.42 | 0.89 | 0.76 |

The mechanical properties here were determined as follows:
Shore D hardness: DIN ISO 7619-1
Tensile strength: DIN EN ISO 527
Elongation at break: DIN EN ISO 527
Elasticity modulus: DIN EN ISO 527
Notched impact strength: DIN EN ISO 179-1/1 eU
Flexural strength: DIN EN ISO 178
Flexural elasticity modulus: DIN EN ISO 178

The table shows that by using catalysts of the invention, a significantly increased level of oxazolidinone groups in comparison to isocyanurate groups is obtained in the solid. This has consequences for the mechanical properties. Hence, when using the catalysts of the invention, there are increases in particular in the glass transition temperature, the notched impact strength and the flexural strength, for constant hardness.

What is claimed is:

1. A process for producing moldings comprising oxazolidinone groups,
wherein:
a) polyisocyanate is mixed with
b) at least one organic compound having two or more epoxide groups,
c) at least one catalyst for the isocyanate/epoxide reaction, and
d) optionally auxiliary and additive materials
to form a reaction mixture, which is introduced into or applied to a mold and reacted to give moldings comprising oxazolidinone groups, wherein the at least one catalyst c) for the isocyanate/epoxide reaction comprises a compound of the general formula $[M(R_1)(R_2)(R_3)(R_4)]^+[X\ I_n]^-$, and wherein:
M is a nitrogen atom or a phosphorus atom,
$R_1$, $R_2$, $R_3$ and $R_4$ are each an organic radical, in each case selected independently of one another from the group consisting of linear or branched-chain alkyl radicals having 1 to 22 carbon atoms and being optionally substituted by heteroatoms or substituents comprising heteroatoms, and of alkyl-bridged cycloaliphatic or aromatic groups having 3 to 22 carbon atoms and being optionally substituted by heteroatoms or by groups comprising heteroatoms, and of aryl radicals having 6 to 18 carbon atoms and being optionally substituted by alkyl groups having 1 to 10 carbon atoms and/or heteroatoms,
X is fluoride, chloride, bromide or iodide,
I is iodine, and
n stands for a rational number from 0.1 to 10.

2. The process according to claim 1, wherein n stands for a rational number from 0.5 to 3.

3. The process according to claim 1, wherein X is chlorine or bromine.

4. The process according to claim 1, wherein the molar ratio of polyisocyanate groups in the polyisocyanate (a) to epoxide groups in the at least one organic compound (b) having two or more epoxide groups is 1:10 to 10:1.

5. The process according to claim 1, wherein the at least one organic compound b) having two or more epoxide groups is selected from the group consisting of polyglycidyl ether of bisphenol A, bisphenol F and novolacs and mixtures thereof.

6. The process according to claim 1, wherein $R_1$, $R_2$, $R_3$ and $R_4$ are each an organic radical in each case selected independently of one another from the group consisting of phenyl, cyclohexyl and linear or branched-chain alkyl groups having 1 to 6 carbon atoms.

7. The process according to claim 1, wherein $R_1$, $R_2$, $R_3$ and $R_4$ are identical.

8. The process according to claim 1, wherein the mold in the reaction of the reaction mixture to give the moldings comprising oxazolidinone groups has a temperature of 140° C. to 280° C.

9. The process according to claim 1, wherein a polyol component comprising the at least one organic compound b) and the at least one catalyst c) is mixed with an isocyanate to form the reaction mixture.

10. The process according to claim 1, wherein an isocyanate component comprising the polyisocyanate a) and the at least one organic compound b) is mixed with the at least one catalyst c) to form the reaction mixture.

11. The process according to claim 1, wherein the polyisocyanate a) used is at least one isocyanate selected from the group consisting of dodecane 1,12-diisocyanate, 2-ethyltetramethylene 1,4-diisocyanate, 2-methylpentamethylene 1,5-diisocyanate, tetramethylene 1,4-diisocyanate, and hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI), and mixtures of crude MDI and tolylene diisocyanates.

12. A method for producing moldings comprising oxazolidinone groups, the method comprising using a catalyst of the general formula $[M(R_1)(R_2)(R_3)(R_4)]^+[X\ I_n]^-$, wherein M is a nitrogen atom or a phosphorus atom,
$R_1$, $R_2$, $R_3$ and $R_4$ are each an organic radical, in each case selected independently of one another from the group consisting of linear or branched-chain alkyl radicals having 1 to 22 carbon atoms and being optionally substituted by heteroatoms or substituents comprising heteroatoms, and of alkyl-bridged cycloaliphatic or aromatic groups having 3 to 22 carbon atoms and being optionally substituted by heteroatoms or by groups comprising heteroatoms, and of aryl radicals having 6 to 18 carbon atoms and being optionally substituted by alkyl groups having 1 to 10 carbon atoms and/or heteroatoms,
X is fluoride, chloride, bromide or iodide,
I is iodine, and
n stands for a rational number from 0.1 to 10,
for producing moldings comprising oxazolidinone groups.

* * * * *